United States Patent [19]

Kraemer et al.

[11] Patent Number: 4,837,270

[45] Date of Patent: Jun. 6, 1989

[54] UNSATURATED POLYESTER RESIN AND MOLDING COMPOUNDS OBTAINED THEREFROM

[75] Inventors: Horst Kraemer; Hartmut Rohmer; Johannes Stawowy, all of Marl, Fed. Rep. of Germany

[73] Assignee: Huels Aktiengesellschaft, Marl, Fed. Rep. of Germany

[21] Appl. No.: 60,786

[22] Filed: Jun. 12, 1987

[30] Foreign Application Priority Data

Jun. 14, 1986 [DE] Fed. Rep. of Germany ....... 3620036

[51] Int. Cl.$^4$ .............................................. C08L 67/06
[52] U.S. Cl. ........................................ 525/27; 525/40; 525/444; C08L/67/06

[58] Field of Search ............................. 525/40, 27, 444

[56] References Cited

U.S. PATENT DOCUMENTS 3,862,064 1/1975 Fry ...................................... 523/509
4,102,837 7/1978 Thomas ................................ 525/40

*Primary Examiner*—Patricia Short
*Attorney, Agent, or Firm*—Millen & White

[57] ABSTRACT

Thermosetting and cold-setting unsaturated polyester resin molding compounds which contain only one saturated polyester as LP additive and which do not show LP drift under usual storage conditions, are provided. Molded articles molded therefrom exhibit low shrinking and a perfect surface.

18 Claims, No Drawings

UNSATURATED POLYESTER RESIN AND MOLDING COMPOUNDS OBTAINED THEREFROM

BACKGROUND OF THE INVENTION

This invention relates to improved unsaturated polyester resin molding compounds (compositions) and particularly to improved cold-setting and thermosetting unsaturated polyester resin molding compounds.

In the manufacture of molded articles from such molding compounds, certain properties have been found to be desirable. Thus, thermosetting molding compounds should set shrinkage-free, i.e., shrink-free, and cold-setting molding compounds should set with low-shrinkage, i.e., they should exhibit an antishrink effect or LP effect. As used herein the term LP (low profile) refers to EP-OS No. 0 028 841, page 2, lines 8 to 31, and DE-OS No. 34 26 425, page 4, lines 5 to 10.

The set molded articles should also exhibit good mechanical properties, especially good elasticity, and a flawless surface, measured in terms of surface smoothness, and surface luster.

The unsaturated polyester resin, containing saturated polyester as LP additive, on which the molding compounds are based, and the molding compounds must not separate during storage under ordinary conditions e.g., ordinary conditions of temperature and time or, in the case of cold-setting molding compounds, potlife. In case of separation, the LP effect generally decreases to unacceptable levels or is lost entirely. Even if the resin and the molding compounds do not separate during storage, the LP effect can still decrease to unacceptable levels or be lost due to LP drift. This also should be avoided.

DE-OS No. 34 26 425 discloses unsaturated polyester resins and molding compounds obtained therefrom, which meet such requirements. However, the resins contain a combination of two types of LP additives, i.e., a thermoplastic polymer in addition to a saturated polyester. Their use is comparatively expensive from a commercial standpoint, e.g., they require expensive warehousing and processing considerations, e.g., expensive mixing procedures, etc.

SUMMARY OF THE INVENTION

It is an object of this invention to provide an unsaturated polyester resin with only one LP additive, i.e., one type of LP additive, from which a thermosetting molding compound and a cold-setting molding compound can be obtained, which meet the above described requirements.

Upon further study of the specification and appended claims, further objects and advantages of this invention will become apparent to those skilled in the art. These objects have been achieved by providing a homogeneous, nonseparating unsaturated polyester resin suitable for use in a molding composition comprising (A) from about 30 to about 60% by weight of an unsaturated polyester; (B) from about 10 to about 30% by weight of a saturated, liquid polyester, i.e., an LP additive; and (C) from about 30 to about 50% by weight of styrene and an effective amount of a conventional stabilizer, e.g., a polymerization inhibitor; the amounts in each case being relative to the final resin; wherein the resin is characterized by the following additional features:

(A) the unsaturated polyester is obtained from (1) a mixture of an alpha, beta-olefinically unsaturated $C_4$-dicarboxylic acid and a saturated, aliphatic $C_4$ to $C_8$ alpha, omega dicarboxylic acid, and (2) a mixture of 1,2-propylene glycol and ethylene glycol, in a known way by polycondensation and having an acid value of about 5 to 40 mg KOH/g; a molar ratio of unsaturated dicarboxylic to saturated dicarboxylic acid of from about 4:1 to 8:1, and a molar ratio of propylene glycol to ethylene glycol of from about 1:1 to 5:1;

(B) the saturated polyester is obtained from (1) a saturated, aliphatic $C_4$ to $C_8$ alpha, omega dicarboxylic acid, and (2) a mixture of ethylene glycol and a saturated, aliphatic diol having primary hydroxyl groups and having 5 or 6 C atoms in the chain between the hydroxy groups and 3 methyl side groups, in a known way by polycondensation and having an acid value of about 15 to 40 and a weight average molecular weight ($\overline{M}w$) of about 5000 to 8000, determined by gel permeation chromatographic analysis (GPC analysis, calibration with polystyrene); and wherein the molar ratio of ethylene glycol to diol is from about 1:1 to 3:1 respectively.

DETAILED DISCUSSION

The dicarboxylic acids can be partly or completely replaced by the corresponding anhydrides, if these are available.

Suitable unsaturated dicarboxyic acids, for use in preparing component A, include maleic acid and its anhydride and fumaric acid and mixtures thereof.

The saturated dicarboxylic acids, for use in preparing components A and B, preferably are $C_4$ to $C_8$ alkane alpha, omega dicarboxylic acids, e.g. succinic acid and its anhydride, glutaric acid and its anhydride, adipic acid, pimelic acid, suberic acid, and mixtures thereof.

Suitable diols, for use in preparing component B include trimethylpentanediol-1,5, trimethylhexanediol-1,6 and mixtures thereof.

The unsaturated polyester, component A, preferably is present in the resins of the invention in concentrations of from about 40% to 50% by weight. The saturated liquid polyester, component B, is preferably present in concentrations of from about 15% to 25% by weight. The styrene component with stabilizer, component C, is preferably present in concentrations of from about 30% to 40% by weight. The above connections are based on the total weight of the resin.

The unsaturated polyester, component A, preferably has an acid value of from about 20 to 35. The molar ratio of unsaturated dicarboxylic acid to saturated dicarboxylic acid is preferably from about 5:1 to 7:1, and the molar ratio of the propylene glycol to ethylene glycol is preferably from about 1.6:1 to 3:1.

The saturated polyester, component B, preferably has an acid value of from about 20 to 30 and a molecular weight of from about 5000 to 7000. The molar ratio of ethylene glycol to the diol is preferably from about 1.5:1 to 2.5:1.

A preferred saturated dicarboxylic acid, for use in components A and B, is adipic acid.

A preferred diol, from which the saturated polyester, component B, is prepared, is trimethylhexanediol-1,6.

The molding compositions of this invention can be employed to form both thermosetting and cold-setting molding compounds. The thermosetting molding compounds of this invention containing the unsaturated polyester resin containing the saturated polyester as a shrink reducing or low profile, LP additive can be employed as bulk molding compounds or as prepreg, e.g., sheet molding compounds. The thermosetting molding compounds generally include an amount of a stabilizer, i.e., polymerization inhibitor, effective to stabilize the compound. Suitable stabilizers are well known to those skilled in the art and those skilled in the art can routinely choose the particular stabilizer and the amount thereof to be employed based on routine processing considerations. The thermosetting molding compounds of this invention also generally contain an amount of a peroxide setting agent effective to cause heat setting of the composition. The particular setting agent and the amount thereof to be employed is also routinely determinable by a person of ordinary skill in the art in conjunction with customary processing considerations.

The cold-setting molding compounds of this invention containing the unsaturated polyester resin containing an LP additive can be employed as a molding or casting compound, or as a mortar or concrete. When employed as a cold-setting molding compound, an amount of a peroxide setting agent and an accelerator effective to cause cold setting is generally employed. Suitable peroxide setting agents and accelerators, as well as the amounts thereof employed, are readily determinable by those of ordinary skill in the art using conventional considerations.

Customary additives may also be employed in the molding compositions of this invention, e.g., fillers, etc.

The molding compounds of this invention are non-separating, e.g., the saturated polyester component does not separate from the other components of the composition under ordinary storage conditions.

The expression "homogeneous resin" is synonymous with the expression "non-separating resin".

The polycondensation steps are fully conventional and well known to those skilled in the art. The necessary conditions are readily determinable perhaps with a few routine, fully conventional optimization tests.

The components A and B are generally obtained by the following procedure.

A mixture of dicarboxylic acid(s), glycols (diycol/diol) and stabilizer is placed in a reaction vessel equipped with a stirrer, a distillation column and a nitrogen inlet. The mixture is heated to 200° C. while introducing nitrogen and separating water at the head of the distillation column. When the desired acid value is obtained the polycondensation reaction is stopped by lowering the temperature. The polyester is added to styrene to yield a solution of the polyester in styrene.

The thermosetting and cold-setting compositions are fully conventional in their preparation.

For the production of the thermosetting molding compounds in general 100 parts of the unsaturated polyester resin is mixed with 0.01 to 0.1 parts of a commercial stabilizer, such as tert-butyl pyrocatechol, p-benzoquinone or di-tert-butyl p-cresol, with 1 to 2 parts of a usual peroxide curing agent causing the thermosetting, such as tert-butyl perbenzoate, tert-butyl peroctoate or mixtures thereof, with 1 to 2 parts of a thickening agent, such as magnesium oxide, magnesium hydroxide or calcium hydroxide, with 3 to 6 parts of a lubricant and parting agent, such as zinc or calcium stearate, with 5 to 10 parts of a paint pigment, and with 150 to 300 parts of a finely ground, dry, mineral filler such as chalk, dolomite, silicates, clays or mixtures thereof. 25 to 65 parts of glass fiber roving is impregnated with 100 parts of the impregnating material thus obtained, in the usual way in a prepreg installation or in a kneader. For the production of the cold-setting molding compounds in general 100 parts of the unsaturated polyeste resin is mixed with 1 to 2 parts of a hydroperoxide, such as methyl ethyl ketone peroxide, and 0.5 to 1.5 parts of a solution of cobalt octoate or naphthenate in styrene (cobalt content: 1%) or with 1 to 2 parts of a commercial benzoyl peroxide powder (50%) and 0.5 to 1.5 parts of a solution of an aromatic amine, such as dimethyl aniline or dimethyl p-toluidine, in styrene (10%), and with 100 to 1000 parts of a dry, mineral filler, such as calcium carbonate, magnesium carbonate, silicates or clays, in which the grain size can be 10 microns to 8 millimeters, depending on the purpose of use.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees celsius; unless otherwise indicated, all parts and percentages are by weight.

In the examples, the comparative example in each case, which does not correspond to the invention, is identified as A, e.g., UP resin, impregnating material, sheet molding compound, set sheets, mortar, set molded article.

EXAMPLES

The unsaturated polyesters and saturated polyesters (LP additives), on which the following tests are based are characterized as indicated in tables 1 and 2.

TABLE 1

| Unsaturated Polyesters UP1 to UP5 | | | | | |
|---|---|---|---|---|---|
| | UP1 | UP2 | UP3 | UP4 | UP5 |
| Maleic acid anhydride* | 6.0 | 6.0 | 6.0 | 6.0 | 6.0 |
| Adipic acid* | 1.0 | 1.0 | 1.0 | 1.0 | 1.0 |
| 1,2-propylene glycol* | 7.35 | 6.35 | 5.35 | 4.35 | 3.35 |
| Ethylene glycol* | — | 1.0 | 2.0 | 3.0 | 4.0 |
| Acid value | 25 | 25 | 30 | 30 | 33 |
| Viscosity, (s)** | 107 | 64 | 59 | 65 | Separation |

*portion of basic moles
**the unsaturated polyester was present as 60% solution in styrene, relative to the solution; measurement was made with viscosity cup 4 at 25° C.

TABLE 2

| Saturated Polyesters LP1 to LP6 | | | | | | |
|---|---|---|---|---|---|---|
| | LP1 | LP2 | LP3 | LP4 | LP5 | LP6 |
| Adipic acid* | 10.0 | 10.0 | 10.0 | 10.0 | 10.0 | 10.0 |
| Ethylene glycol* | — | 5.3 | 7.0 | 7.0 | 7.0 | 7.0 |
| 1,2-propylene glycol* | 10.5 | 5.5 | — | — | — | — |
| Trimethylhexanediol-1,6* | — | — | 3.5 | 3.5 | 3.5 | — |
| Neopentyl glycol* | — | — | — | — | — | 3.5 |
| Acid value | 30 | 31 | 25 | 20 | 13 | 20 |
| Molecular Weight | 5000 | 6000 | 5500 | 7000 | 11000 | 6000 |
| Viscosity, (s)** | 98 | 145 | 115 | 167 | 339 | 143 |

*Portion of basic moles; the trimethylhexanediol-1,6 is an industrial isomer mixture, consisting of about 30% of 2,2,4- and about 70% of 2,4,4-trimethylhexanediol-1,6;
**the unsaturated polyester was present as 80% solution in styrene, relative to the solution; measurement was made with viscosity cup 4 at 25° C.

PRODUCTION OF UNSATURATED POLYESTER RESIN 1 (UP RESIN 1)

75 parts of the solution of unsaturated polyester UP3 in styrene (corresponding to 45 parts of unsaturated polyester) and 25 parts of the solution of saturated polyester LP3 in styrene (corresponding to 20 parts of the saturated polyester; altogether corresponding to 35 parts of styrene) were mixed.

The following, unsaturated polyester resins were produced in a corresponding way:
UP resin 2: UP3/LP4
UP resin 3: UP4/LP3
UP resin 4: UP4/LP4
UP resin A: UP3/LP6

Production and characterizing of sheet molding compound 1 and set sheet 1

100 parts of UP resin 1 obtained above was mixed with 0.6 parts of a 10% solution of p-tert-butyl pyrocatechol in styrene, 1.0 part of tert-butyl perbenzoate, 2.0 parts of a commercially available magnesium oxide paste (50% in a usual paste polyester), 3.0 parts of zinc stearate, 6.0 parts of a coloring pigment and 166 parts of a finely ground calcite.

25 parts of glass fiber rovings cut to suitable length were impregnated in a sheet molding compound installation with 75 parts of impregnating material 1 obtained above. Sheet molding compound 1 (resin mat 1) was stored 50 days at room temperature (see table 3).

It was then pressed into a sheet in a polished mold (120 mm×120 mm×4 mm) for 2 minutes at 170 bar (145° C. in the lower and 150° C. in the upper part of the mold). The set sheet 1 (pressed sheet 1) was taken from the mold and measured after storage at room temperature for 24 hours (see table 3).

Impregnating materials, sheet molding compounds and set sheets 2 to 4 and A were obtained correspondingly (see table 3).

TABLE 3

Characterizing of the sheet molding compounds and set sheets 1 to 4 and A

| Sheet molding compound after 50 d storage | | Set sheet Change in length (DIN 53 464) %* | Surface of set sheet |
|---|---|---|---|
| 1 | No separation | 0.12 | glossy |
| 2 | No separation | 0.12 | glossy |
| 3 | No separation | 0.16 | glossy |
| 4 | No separation | 0.11 | glossy |
| A | No separation | −0.11 | dull |

*The change of length was determined as the difference from the edge length of the cold sheet after storage and the edge length of the cold mold.

Production and characterizing of mortar 1 and of set molded article 1

100 parts of UP resin 1 obtained above was mixed with 2.0 parts of methyl ethyl ketone peroxide, 1.0 part of a solution of cobalt octoate in styrene (cobalt content: 1%) and 700 parts of a mixture of aggregate (11% of finely ground dolomite, 28.8% sand with a particle size of 0.1 to 0.25 mm, 33.7% of sand with a particle size of 1 to 2 mm and 25.9% of gravel with a particle size of 2 to 4 mm).

Mortar 1 thus obtained was poured into a steel mold (50 mm×50 mm×1000 mm), vibrated and then set (24 hours at room temperature and 5 hours at 70° C.). The set molded article 1 was removed from the mold after cooling and measured (see table 4).

Mortar A and set molded article A were correspondingly obtained (see table 4).

TABLE 4

Characterizing of set molded article 1 and A

| | Change of length (%) |
|---|---|
| 1 | −0.14 |
| A | −0.35 |

UP resins, based on these UP/LP combinations conceivable according to tables 1 and 2, which were not yet discussed, let to disadvantageous (unusable) results. These UP resins as also UP resin A are not part of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A homogeneous, non-separating unsaturated polyester resin, suitable for use in a molding composition, comprising (A) from about 30 to 60% by weight of an unsaturated polyester, (b) from about 10 to 30% by weight of a saturated, liquid polyester as a shrink-reducing or LP additive, (C) from about 30 to 50% by weight of styrene and an effective amount of a polymerization inhibition stabilizer wherein the amounts of (A), (B), and (C) are based on the final resin; and wherein
   (a) said unsaturated polyester is obtained by polycondensation of
      (1) a mixture of an alpha, beta olefinically unsaturated $C_4$ dicarboxylic acid and a saturated, aliphatic $C_4$ to $C_8$ alpha, omega dicarboxylic acid and
      (2) a mixture of 1,2-propylene glycol and ethylene glycol,
   and wherein said unsaturated polyester has an acid value of from about 5 to 40 mg KOH/g; the molar ratio of said unsaturated dicarboxylic acid to said saturated dicarboxylic acid is from about 4:1 to 8:1; and the molar ratio of said propylene glycol to said ethylene glycol is from about 1:1 to 5:1, respectively; and
   (b) said saturated polyester is obtained by polycondensation of
      (1) a saturated, aliphatic $C_4$ to $C_8$ alpha, omega dicarboxylic acid, and
      (2) a mixture of ethylene glycol and a saturated, aliphatic diol having primary hydroxyl groups and having 5 or 6 C atoms in the chain between the hydroxyl groups and 3 methyl side groups,
   and wherein said saturated polyester has an acid value of from about 15 to 40 and a weight average molecular weight of from about 5000 to 8000, determined by gel permeation chromatographic analysis and the molar ratio of said ethylene glycol to said diol is from about 1:1 to 3:1.

2. A resin of claim 1 wherein the molar ratio of said unsaturated dicarboxyic acid to said saturated dicarboxylic acid of said unsaturated polyester is from about 5:1 to about 7:1.

3. A resin of claim 2 wherein the molar ratio of said propylene glycol to said ethylene glycol of said unsaturated polyester is from about 1.6:1 to about 3:1.

4. A resin of claim 3 wherein the molar ratio of said ethylene glycol to said diol of said saturated polyester is from about 1.5:1 to about 2.5:1.

5. A resin of claim 1 wherein said saturated dicarboxylic acid from which said unsaturated polyester is prepared is adipic acid.

6. A resin of claim 1 wherein said saturated dicarboxylic acid from which said saturated polyester is prepared is adipic acid.

7. A resin of claim 1 wherein said saturated dicarboxylic acid from which said unsaturated polyester is prepared is adipic acid, said saturated dicarboxylic acid from which said saturated polyester is prepared is adipic acid and said diol from which said saturated polyester is prepared is trimethylhexanediol-1,6.

8. A resin of claim 1 wherein said unsaturated dicarboxylic acid from which said unsaturated polyester is prepared is maleic acid, maleic acid anhydride, fumaric acid and mixtures thereof, and wherein said saturated dicarboxylic acid from which said unsaturated polyester is prepared is succinic acid, succinic acid anhydride, glutaric acid, glutaric acid anhydride, adipic acid, pimelic acid or suberic acid, or mixtures thereof.

9. A resin of claim 1 wherein said saturated dicarboxylic acid from which said saturated polyester is prepared is succinic acid, succinic acid anhydride, glutaric acid, glutaric acid anhydride, adipic acid, pimelic acid, or suberic acid, or mixtures thereof.

10. A thermosetting molding composition comprising an unsaturated polyester resin of claim 1, and an amount of a peroxide setting agent effective to cause heat setting.

11. A thermosetting molding composition comprising an unsaturated polyester resin of claim 4 and an amount of a peroxide setting aget effective to cause heat setting.

12. A thermosetting molding composition comprising an unsaturated polyester resin of claim 6 and an amount of a peroxide setting agent effective to cause heat setting.

13. A cold-setting molding composition comprising an unsaturated polyester resin of claim 1 and an amount of a peroxide setting agent and an accelerator effective to cause cold setting.

14. A cold-setting molding composition comprising an unsaturated polyester resin of claim 4 and an amount of a peroxide setting agent and an accelerator effective to cause cold setting.

15. A cold-setting molding composition comprising an unsaturated polyester resin of claim 6 and an amount of a peroxide setting agent and an accelerator effective to cause cold setting.

16. In a molded product prepared from a molding composition, the improvement wherein the molding composition is one of claim 10.

17. In a molded product prepared from a molding composition, the improvement wherein the molding composition is one of claim 12.

18. In a molded product prepared from a molding composition, the improvement wherein the molding composition is one of claim 13.

* * * * *